(12) United States Patent
Fosbinder et al.

(10) Patent No.: US 7,411,154 B2
(45) Date of Patent: Aug. 12, 2008

(54) CONTROL PANEL FOR A WELDING-TYPE APPARATUS

(75) Inventors: Daniel C Fosbinder, Appleton, WI (US); John C Leisner, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 295 days.

(21) Appl. No.: 10/907,234

(22) Filed: Mar. 24, 2005

(65) Prior Publication Data

US 2006/0215389 A1    Sep. 28, 2006

(51) Int. Cl.
*B23K 9/10* (2006.01)
*F21V 33/00* (2006.01)
(52) U.S. Cl. ........................ 219/130.1; 362/85
(58) Field of Classification Search ........... 219/130.5, 219/137.71, 130.1; 228/102; 362/85
See application file for complete search history.

(56) References Cited

U.S. PATENT DOCUMENTS 5,005,009 A * 4/1991 Roberts .................. 345/7
6,315,186 B1 * 11/2001 Friedl et al. .............. 228/102
2004/0173591 A1 * 9/2004 Knoener .................. 219/130.5
2004/0178183 A1 * 9/2004 Cigelske, Jr. ............. 219/130.1

OTHER PUBLICATIONS

"Contrast enhancement filter, Plastic lamination", 2002, pp. 1-3, http://www.opticalfilters.co.uk/applications/contrastfilter.htm.*

* cited by examiner

*Primary Examiner*—Kevin P Kerns
(74) *Attorney, Agent, or Firm*—Ziolkowski Patent Solutions Group, SC

(57) ABSTRACT

A welding-type apparatus has a control panel with enhanced viewability. The control panel may include LEDs, backlit LCDs, and other light-emitting indicators whose viewability by a user is enhanced when the control panel is subjected to relatively intense ambient light, such as direct sunlight. The control panel includes light reflecting, light refracting, light filtering, and/or light absorbing components to enhance the intensity of the light emitted by the light-emitting indicators relative to ambient light incident thereon.

18 Claims, 2 Drawing Sheets

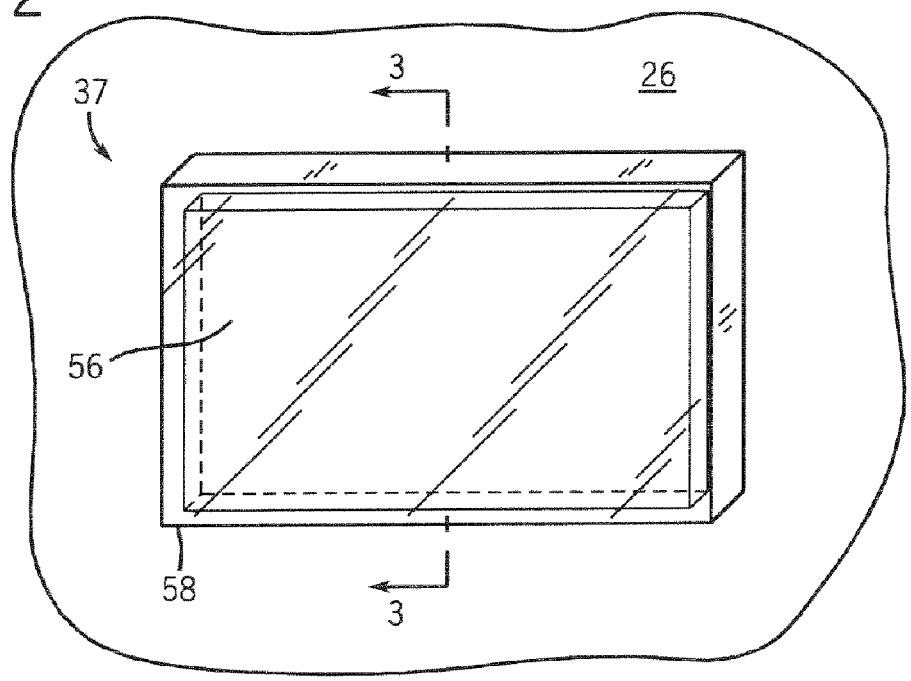
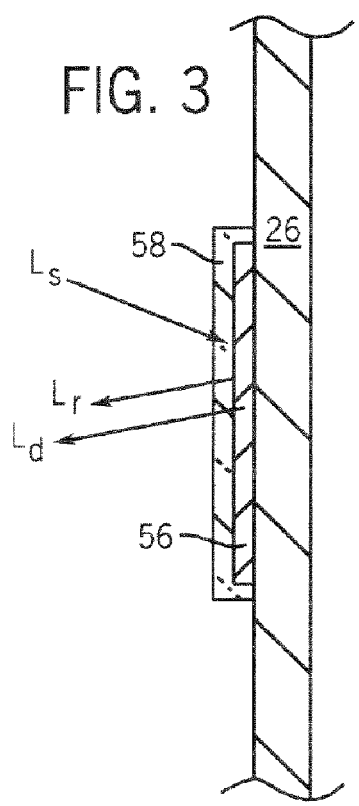
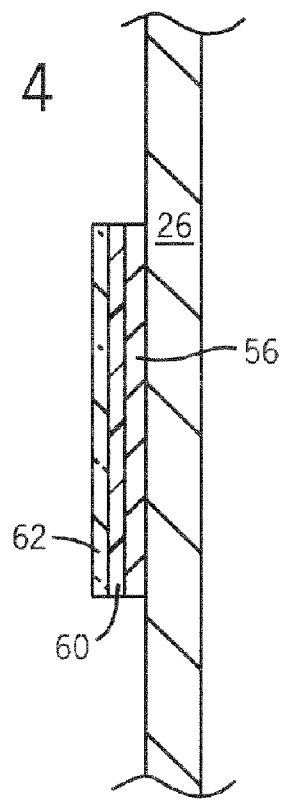

CONTROL PANEL FOR A WELDING-TYPE APPARATUS

BACKGROUND OF THE INVENTION

The present invention relates generally to welding-type machines and, more particularly, to a light filtering assembly that improves detectability of light emitted by a light-emitting device or readability of a display. In this regard, the present invention is further directed to reflecting, refracting, absorbing, or otherwise dissipating ambient light incident on an indicator or display so as to enhance detectabilty of the emitted light or readability of the display when the light-emitting device or display is subjected to relatively intense ambient light, such as direct sunlight.

Welding-type machines, such as welders (power sources), plasma cutters, heaters, aircraft ground power units, wire feeders, generators, and the like, typically have liquid crystal displays (LCDs) or light-emitting diodes (LEDs) to provide visual indicators to a user regarding operating conditions of the machine. For example, an engine-driven generator may include LEDs for an engine hour meter, a low fuel indicator, a low engine oil pressure indicator, a low battery indicator, and the like. A welding-type machine may also include an LCD designed to display one or more menus to a user.

To improve their viewability, LEDs and backlit LCDs are constructed and powered to emit relatively bright light. In this regard, a user can easily distinguish between a lit and a non-lit indicator. However, because of size, thermal, and power constraints, the brightness of the light is constrained. As a result, it may be difficult, in some situations, for a user to appreciate that a particular LED is lit or determine what is being displayed on an LCD.

For example, welders and other welding-type machines are commonly used in outdoor as well as indoor environs. When used in an outdoor environment, the intensity of the ambient light, i.e. sunlight, might be such that a user has difficulty in ascertaining whether a particular LED is lit or have difficulty in reading the alphanumeric characters of an LCD. As a result, increasingly, welding-type machines are being equipped with shades to ease a user's detectability of a lit LED or readability of an LCD when the machine is being used outdoors. While helpful, when the indicator is subjected to direct sunlight, shades have been shown to be inadequate.

It would therefore be desirable to have a indicator whereby a user can easily detect illumination thereof when subjected to direct sunlight.

BRIEF DESCRIPTION OF THE INVENTION

The present invention provides a light filtering device for a indicator that overcomes the aforementioned drawbacks. The assembly enhances the intensity of the light emitted by the indicator relative to the intensity of ambient light incident thereon. In this regard, user detectability of light emitted by the indicator is enhanced.

A control panel for a welding-type apparatus having enhanced viewability is provided. The control panel may include LEDs, LCDs, and other indicators whose viewability by a user is enhanced when the control panel is subjected to relatively intense ambient light, such as direct sunlight. The control panel includes light reflecting, light refracting, light filtering, and/or light absorbing components to enhance the intensity of the light emitted by the lighted indicator relative to ambient light incident thereon.

Therefore, in accordance with one aspect, the present invention includes a welding-type apparatus. The apparatus includes a control panel and a indicator connected to the control panel and configured to illuminate to indicate an operating parameter of a welding-type process. The apparatus further has a cover connected to the control panel and having the indicator disposed therein. The cover is designed to enhance illumination of the indicator when the control panel is subjected to ambient light.

In accordance with another aspect, the present invention includes a control panel for a welding-type machine. The control panel has a generally planar face and an indicator integrally connected thereto. The indicator is designed to illuminate upon a given operating condition of a welding-type machine and emit light at a given wavelength. The control panel further has a contrast enhancement filter disposed at a light-emitting end of the indicator and configured to filter light impinged thereon at wavelengths other than the given wavelength.

According to another aspect of the present invention, a welding-type machine is disclosed and has means for providing a welding-type output and means for visually indicating operating status of the providing means. The machine further has means for enhancing illumination of the visual indicating means relative to intensity of ambient light incident on the visual indicating means.

Various other features and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings:

FIG. 2 is a front elevational view of a portion of the control panel of the welder illustrated in FIG. 1.

FIG. 3 is a cross-sectional view of that illustrated in FIG. 2 taken along lines 3-3 thereof.

FIG. 4 is a cross-sectional view of a light-emitting device assembly in accordance with an alternate embodiment of the present invention.

DETAILED DESCRIPTION OF THE PREFERRED EMBODIMENT

Figure 1:
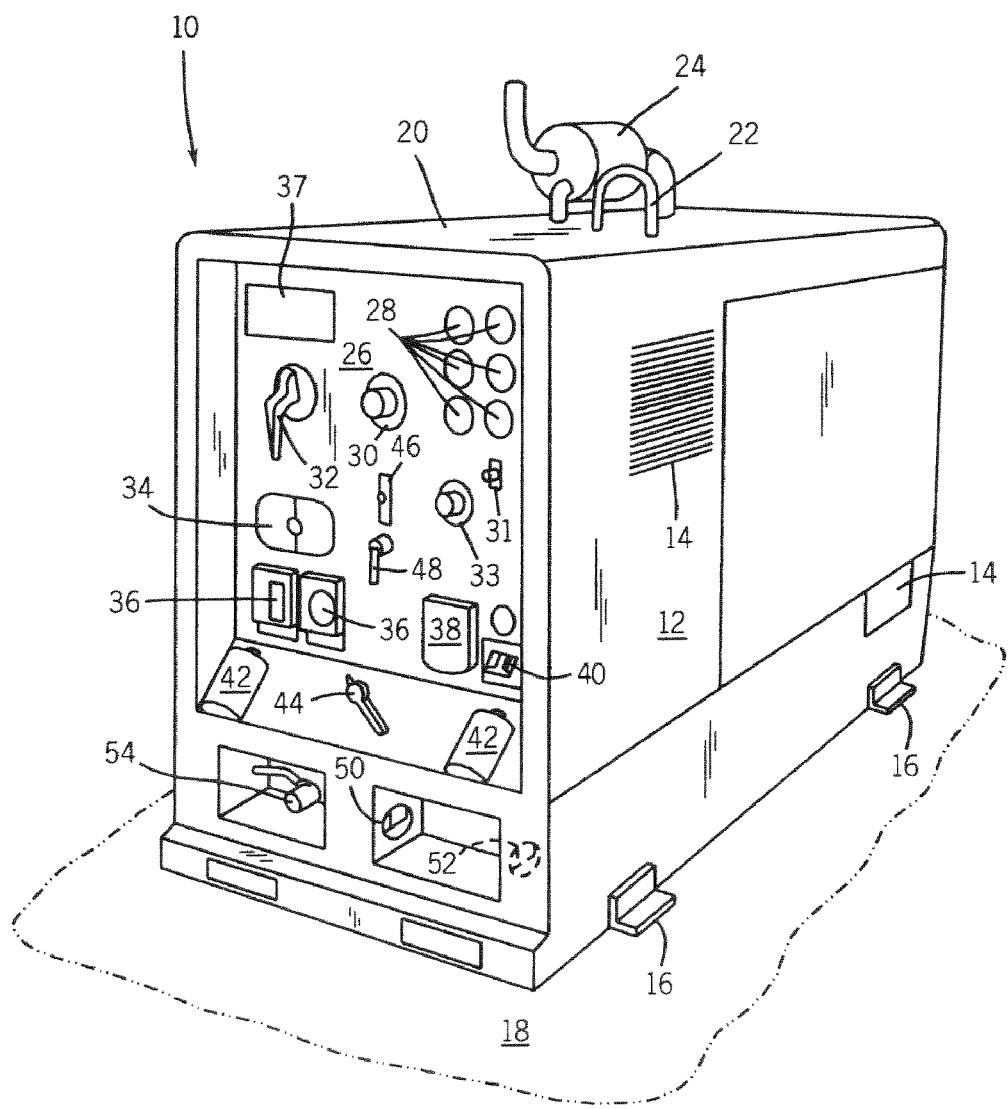
FIG. 1 is a perspective view of an integrated engine-driven generator and welder incorporating the present invention.

While the present invention will be described with respect to an indicator of an integrated engine-driven generator and welder, it is understood that the invention is application with other welding-type machines, such as wire feeders, welders, torches or guns, plasma cutters, aircraft ground power units, induction heaters, gas regulators, and the like.

Referring now to FIG. 1, an integrated engine-driven generator and welder 10 is shown. The welder 10 has an outer housing 12 that has one or more air vents 14 for cooling internal components thereof. The housing 12 can be easily removed to permit access to the internal components for maintenance and service. A plurality of support members 16 provides stabilization for the welder 10 when placed on a generally level surface, such as surface 18. An upper surface 20 of the welder 10 includes a lifting hook 22 extending therethrough for lifting and transporting of the welder 10. Also attached to the upper surface 20 is an exhaust system 24 that lowers noise and removes exhaust gas from the welder 10.

The welder 10 includes a control panel 26 that has various control elements, LEDs, LCDs, and gauges for operating the welder 10 and monitoring its operation. The gauges and indicators 28 measure and provide visual feedback regarding various parameters of the welder 10, respectively. Measured parameters can include oil pressure, fuel level, oil temperature, battery amperage, air pressure, and engine running time. Control panel 26 also has a control dial 30 and an ampere range switch 32 which are used to select a voltage/amperage for welding operations. Process selector switch 34 selects the type of weld output. The weld output is determined by the type of welding process. Examples of weld processes that may be implemented include stick welding, TIG welding, air-carbon arc cutting, and various wire feed processes. Electrical outlets 36 provide power for electrically driven devices, such as saws, drills, etc. Control panel 26 also includes a compressor on/off switch 31 and an engine control switch 33 to independently control a compressor and engine, respectively. In a preferred embodiment, the welder 10 has an LCD 37 connected to or otherwise integrated with control panel 26.

The control panel 26 also includes multiple power connections such as single phase power connection 38, optional three-phase power connection 40, and weld-power receptacles 42. An optional polarity switch 44 can be used to select the polarity of the weld output. Typical selections include direct current electrode negative, direct current electrode positive, and alternating current. A panel remote switch 46 and remote receptacle 48 select remote control of the welder 10 in instances where welding operations are remotely located from the welder 10. Positive 50 and negative 52 battery charge connections are used for battery jumpstart or charging, and are positioned adjacent to a system output or shut-off valve 54. Upon engaging of the compressor clutch and opening of valve 54, compressed air is supplied for air assisted carbon arc cutting or to air driven power tools and other pneumatic operations.

Referring now to FIG. 2, a partial elevational view of the control panel 26 of the welder 10 is shown. The light-emitting device assembly 37 includes a light-emitting indicator 56, such as an LED or backlit LCD, connected to the control panel 26. In this regard, the control panel has a generally planar face designed to receive device 56. In the illustrated embodiment, the light-emitting device 37 is a backlit LCD, but it is contemplated that the indicator 37 may be an LED or other device designed to emit light or illuminate.

Assembly 37 also has a cover 58 designed to enclose the light-emitting indicator 56. Preferably, the cover 58 is formed of plastic so as to be resistant to fracture, but it is contemplated that it could also be formed of glass, ceramic, or other material(s). Cover 58 not only defines a housing for the indicator, but is also constructed to enhance the illumination of the indicator when the control panel is exposed to relatively intense ambient light, such as sunlight. In this regard, the cover protects the indicator from debris, dirt, and dust, but also improves user detectability of the light emitted from the indicator.

FIG. 3 is a cross-sectional view of that shown in FIG. 2 taken along lines 3-3 thereof. As shown, indicator 56 is secured to or integrated with control panel 26. Moreover, the indicator is housed within cover 58. The cover 58 protects the indicator 56 from debris, dirt, and dust, but is formed of contrast enhancing material, such as contrast enhancing plastic, ceramic, or glass. In this regard, the cover enhances contrast between ambient light incident on the indicator and the light emitted by the indicator. Accordingly, the cover 58 preferably has a color that is matched to the color emitted by the indicator 56. As such, if the indicator 56 is designed to emit red light, then the cover 58 should also have a red color.

In a preferred embodiment, the cover 58 operates as a contrast enhancement filter and, as such, is used to increase the difference between the intensity of ambient light reflected by the indicator and the intensity of the light emitted by the indicator. That is, as is well-known, if the light (Lr) reflected by the indicator has an intensity that equals or is greater than the intensity of the light (Ld) emitted by the indicator, then a viewer would be unable to distinguish the reflected light from the indicator-emitted light. Therefore, cover 58 is designed to absorb light to reduce the amount of light reflected by the indicator 56.

Still referring to FIG. 3, as shown, ambient light (Ls) is shone upon the control panel. Cover 58, as a contrast enhancement filter, absorbs portions of the ambient light directed toward the control panel so that the light (Lr) reflected has an intensity less than that of the light (Ld) emitted by the indicator. For example, if the cover is a red filter and the indicator is designed to emit red light then the cover will reduce ambient light for all non-red colors and absorb a percentage of the light transmitted therethrough. In this regard, the cover will not only absorb non-red light, but will also reduce the intensity of the red light that passes therethrough. This improves the contrast between reflected ambient light and the light emitted by the indicator.

For example, given the intensity of the ambient light, Ls, has an intensity value of 500 and the cover is designed to filter 50% of light transmissions and has an absorption coefficient of 350, then the intensity of the light that passes through the filter, Lc (Ls minus the light absorbed by the filter) would equal 150. Lr, as a result of the 50% filtering, would equal 75. Given that the indicator is designed to emit light (Ld) at a value of 400 then Lr would be much less than Ld. As such, the contrast between the light reflected by the control panel and the light emitted by the indicator would be significantly improved. For the above example, the contrast ratio CE, (Ld/Lr), would exceed 5:1. It is understood that the above values are merely exemplary and that the present invention is applicable with covers that have greater or lesser filtering and absorbing power as well as indicators capable of greater or lesser light emission intensity. However, it is preferred that the cover be constructed to achieve a significant reduction in reflected light intensity without significantly impacting the light emitted by the indicator.

Referring now to FIG. 4, a cross-sectional view similar to that shown in FIG. 3, illustrates an another embodiment of the present invention. In this embodiment, a circular polarizer is used to enhance the contrast between reflected ambient light and the light emitted by the indicator. The circular polarizer is formed from a pair of laminates 60, 62 secured to the indicator 56. In this regard, a quarter wave retarder 60 is sandwiched between a light-emitting end of the indicator 56 and a linear polarizer layer 62. The laminates 60 and 62 may be formed of plastic, glass, ceramic, or other composite material(s).

Laminates 60 and 62 modify the ambient light, i.e. direct sunlight, as it passes therethrough and traps the mirror image on reflection from the surface of the indicator. The light emitted by the light-emitting device is allowed to pass through the laminates and, as a result, appears as a bright image against a dark background. In this regard, the circular polarizer traps the incident ambient light and uses it as a background on which the light emitted by the indicator 56 is shone. Moreover, the polarizer reduces wash-out typically caused by reflected ambient light. As such, the contrast between the ambient light and the emitted light improves detectability and viewability for a viewer.

Heretofore, the present invention has been described with respect to cover assemblies that absorb or otherwise trap direct ambient light so as to enhance contrast between light reflected from the indicator versus light emitted by the light-emitting device. One skilled in the art will appreciate, however, that additional techniques may be used to enhance the viewability of the indicator. For example, a refracting lens or cover may be used so as to deflect light from a direct incident path to an oblique path. Additionally, it is contemplated that a cover designed to reflect direct ambient light may also be used to enhance the viewability of the indicator. Accordingly, a control panel for a welding-type apparatus includes LEDs, backlit LCDs, and other light-emitting devices. The control panel includes light reflecting, light refracting, light filtering, and/or light-absorbing components to enhance the viewability of the various light-emitting devices.

As one skilled in the art will fully appreciate, the heretofore description of welding devices not only includes welders, but also includes any system that requires high power outputs, such as heating and cutting systems. Therefore, the present invention is equivalently applicable with any device requiring high power output, including welders, plasma cutters, induction heaters, aircraft ground power units, and the like. Reference to welding power, welding-type power, or welders generally, includes welding, cutting, heating power, or ground power for aircraft. Description of a welding apparatus illustrates just one embodiment in which the present invention may be implemented. The present invention is equivalently applicable with many high power systems, such as cutting and induction heating systems, aircraft ground power systems or any similar systems.

Therefore, the present invention includes a welding-type apparatus. The apparatus includes a control panel and an indicator connected to the control panel and configured to illuminate to indicate an operating parameter of a welding-type process. The apparatus further has a cover connected to the control panel and having the indicator disposed therein. The cover is designed to enhance illumination of the indicator when the control panel is subjected to ambient light.

The present invention also includes a control panel for a welding-type machine. The control panel has a generally planar face and an indicator integrally connected thereto. The indicator is designed to illuminate upon a given operating condition of a welding-type machine and emit light at a given wavelength. The control panel further has a contrast enhancement filter disposed at a light-emitting end of the indicator and configured to filter light impinged thereon at wavelengths other than the given wavelength.

A welding-type machine is disclosed and has means for providing a welding-type output and means for visually indicating operating status of the providing means. The machine further has means for enhancing illumination of the visual indicating means relative to intensity of ambient light incident on the visual indicating means.

The present invention has been described in terms of the preferred embodiment, and it is recognized that equivalents, alternatives, and modifications, aside from those expressly stated, are possible and within the scope of the appending claims.

What is claimed is:

1. A welding-type apparatus comprising:
    a control panel;
    an indicator connected to the control panel and configured to illuminate to indicate an operating parameter of a welding-type process; and
    a cover connected to the control panel and having the indicator disposed therein, the cover designed to enhance illumination of the indicator through the cover when the control panel is subjected to ambient light.

2. The welding-type apparatus of claim 1 wherein the cover includes a contrast enhancement filter.

3. The welding-type apparatus of claim 2 wherein the indicator is configured to emit light at a given color and wherein the contrast enhancement filter is matched to the given color.

4. The welding-type apparatus of claim 3 wherein the contrast enhancement filter is designed to substantively eliminate reflection of all colors other than the given color emitted by the light-emitting device.

5. The welding-type apparatus of claim 1 wherein the cover is further designed to reduce wash-out caused by ambient light reflected from the indicator.

6. The welding-type apparatus of claim 1 wherein the cover is formed of plastic.

7. The welding-type apparatus of claim 1 wherein the ambient light includes direct sunlight.

8. The welding-type apparatus of claim 1 configured as one of:
    a welder;
    a wire feeder;
    a plasma cutter;
    an induction heater;
    a welding torch or gun;
    a cutting torch or gun;
    a shielding gas regulator; and
    a generator.

9. A control panel for a welding-type machine, the control panel comprising:
    a generally planar face;
    an indicator integrally connected to the generally planar face, the indicator designed to illuminate upon a given operating condition of a welding-type machine and emit light at a given wavelength; and
    a contrast enhancement filter disposed at a light-emitting end of the indicator and configured to filter light impinged thereon at wavelengths other than the given wavelength.

10. The control panel of claim 9 wherein the contrast enhancement filter has a color matched to that of the light emitted by the indicator.

11. The control panel of claim 9 wherein the contrast enhancement filter is configured to reduce an intensity of ambient light at wavelengths other than the given wavelength that is reflected by the generally planar face.

12. The control panel of claim 9 wherein the indicator is one of an LED and an LCD.

13. The control panel of claim 9 wherein the contrast enhancement filter is formed of plastic.

14. The control panel of claim 9 wherein the welding-type machine includes one of:
    a welder;
    a wire feeder;
    a plasma cutter;
    an induction heater;
    a welding gun or torch;
    a cutting fin or torch;
    a gas regulator; and
    a generator.

15. A welding-type machine comprising:
    means for providing a welding-type output;
    means for visually indicating operating status of the providing means; and
    means for enhancing illumination of the visual indicating means relative to intensity of ambient light incident on the visual indicating means.

16. The welding-type machine of claim 15 wherein the enhancing illumination means includes means for absorbing light incident thereon that is at a wavelength different than that of light emitted by the visual indicating means.

17. The welding-type machine of claim 16 wherein the light absorbing means includes a contrast enhancement filter.

18. The welding-type machine of claim 15 wherein the visual indicating means includes one of an LED and an LCD.

* * * * *

UNITED STATES PATENT AND TRADEMARK OFFICE
CERTIFICATE OF CORRECTION

PATENT NO. : 7,411,154 B2  
APPLICATION NO. : 10/907234  
DATED : August 12, 2008  
INVENTOR(S) : Fosbinder et al.

It is certified that error appears in the above-identified patent and that said Letters Patent is hereby corrected as shown below:

Col. 6, line 56 (Claim 14), delete "fin" and substitute therefore -- gun --.

Signed and Sealed this

Twenty-third Day of December, 2008

JON W. DUDAS  
*Director of the United States Patent and Trademark Office*